United States Patent [19]
Watanabe

[11] Patent Number: 5,603,367
[45] Date of Patent: Feb. 18, 1997

[54] SLIPPAGE PREVENTING TIRE, METHOD FOR PRODUCING A TREAD SURFACE OF A SLIPPAGE PREVENTING TIRE AND METHOD FOR PRODUCING A SLIPPAGE PREVENTING TIRE

[76] Inventor: Seichi Watanabe, 2-5, Teramachi 3-chome, Itoigawa-shi, Niigata-ken, Japan

[21] Appl. No.: 555,504

[22] Filed: Nov. 8, 1995

Related U.S. Application Data

[63] Continuation of Ser. No. 277,997, Jul. 20, 1994, abandoned.

[30] Foreign Application Priority Data

Mar. 31, 1994 [JP] Japan .................................. 6-063476

[51] Int. Cl.$^6$ ........................... B60C 11/14; B29D 30/06
[52] U.S. Cl. ............... 152/209 R; 156/114; 260/998.13; 523/150; 152/210
[58] Field of Search ........................... 156/114; 152/210, 152/169, 185, 196, 197, 198, 208, 209 R; 260/998.13; 523/150; 428/141, 143, 144, 145, 147

[56] References Cited

U.S. PATENT DOCUMENTS

| | | | |
|---|---|---|---|
| 2,582,701 | 1/1952 | Iknayan | 156/114 X |
| 2,793,136 | 5/1957 | Root | 523/150 X |
| 3,666,613 | 5/1972 | Beninga | 156/114 X |
| 3,789,050 | 1/1974 | Loricchio | 260/998.13 X |
| 3,827,885 | 8/1974 | Baum | 152/210 X |
| 3,878,147 | 4/1975 | Craven | 523/150 |
| 4,219,452 | 8/1980 | Littlefield | 260/998.13 |
| 5,162,395 | 11/1992 | Yamazaki et al. | 523/150 X |

FOREIGN PATENT DOCUMENTS 184510  7/1988  Japan .

*Primary Examiner*—Michael W. Ball
*Assistant Examiner*—Francis J. Lorin
*Attorney, Agent, or Firm*—Pollock, Vande Sande & Priddy

[57] ABSTRACT

A method for producing a slippage preventing tire. Hard fine members and adhesives are mixed, thereby attaching the adhesives to the hard fine members. The hard fine members include at least one member selected from the group consisting of sand, ceramic particles and fiber reinforced resin particles. A silicone resin is mixed with a rubber material. The hard fine members and the attached adhesives are mixed with the rubber material and silicone resin prior to curing the adhesives. At least a tread surface of a tire is formed from the mixed hard fine members, adhesives, silicone resin, and rubber material, thereby providing the tire with excellent slippage preventing capacity.

11 Claims, 4 Drawing Sheets

SLIPPAGE PREVENTING TIRE, METHOD FOR PRODUCING A TREAD SURFACE OF A SLIPPAGE PREVENTING TIRE AND METHOD FOR PRODUCING A SLIPPAGE PREVENTING TIRE

This application is a continuation of U.S. patent application Ser. No. 08/277,997, filed Jul. 20, 1994, now abandoned.

FIELD OF THE INVENTION

The present invention relates to a tire slippage preventing member for use instead of stud pins. The invention also relates to a slippage preventing tire for use instead of a snow-tire and a studless tire. Further the invention relates to a manufacturing method for producing a tread surface of the slippage preventing tire and a method for producing the slippage preventing tire.

BACKGROUND OF THE INVENTION

A studded tire from which metal made pins are projected for use in the winter season, and a studless tire wherein special grooves are formed in its tread surfaces have been frequently used.

However, the use of studded tires has been recently prohibited due to the dust problems, road wear problems and the like. Today, therefore, various makers have tried to develop tires which are provided with means for increasing the frictional coefficient on a water soaked or snowy road.

For instance, it has been proposed to use tires in which pulverized materials, such as broken egg shells or small pieces of walnuts, are embedded in the tread surface portion, as shown in Japanese Patent Application Laid-Open No. Hei 6-41355.

However, these tires suffer from problems that the embedded materials such as pulverized eggs, metal pieces and walnut pieces would fall apart from the tread surface portions. As a result, of course, the slippage preventing function would deteriorate.

As a result of elaborate studies made by the present inventor, it has been found that the reason why the pulverized egg shell pieces would fall apart from the tread surface portion of the tires would be based upon the fact that the bonding between the pulverized pieces and the rubber materials become worse and the rubber material becomes hard in particular at a low temperature. In order to solve these problems, the present inventor developed the present invention.

SUMMARY OF THE INVENTION

An object of the present invention is to provide a novel slippage preventing tire, and a tire slippage preventing means that excel in the function of preventing slippage.

The inventive concept of the invention will now be described.

According to the present invention, there is provided a tire slippage preventing member comprising a pin-like member which projects from a tread surface of a tire. The pin-like member is made of a mixture of hard fine members including least one member selected the group consisting essentially of sand, ceramic particles, and fiber reinforced resin particles, a predetermined rubber material and a silicone resin.

Also, the present invention provides a tire slippage preventing member comprising a strip-like member that is projected from a tread surface of a tire. The strip-like member is made of a mixture of hard fine members including at least one member selected from the group consisting essentially of sand, ceramic particles, and fiber reinforced resin particles, a predetermined rubber material and a silicone resin.

According to another aspect, the invention provides a slippage preventing tire comprising a member made of hard fine members including a mixture of at least one member selected from the group consisting essentially of sand, ceramic particles, and fiber reinforced resin particles, a predetermined rubber material and a silicone resin.

According to the invention, there is provided a method for producing a tread surface portion of a slippage preventing tire.

The method includes the step of mixing hard fine members, including at least one member selected from the group consisting essentially of sand, ceramic particles and fiber reinforced resin particles, and adhesives. The fine hard members are further mixed with a predetermined rubber material before the adhesives are cured. A tread surface portion is formed in a predetermined method with the rubber material.

The step of mixing the hard fine members with the predetermined rubber material further may comprise mixing a silicone system resin with the predetermined rubber material.

According to another aspect of the invention, there is provided a method for producing a slippage preventing tire.

The method includes mixing hard fine members, including at least one member selected from the group consisting essentially of sand, ceramic particles and fiber reinforced resin particles, and adhesives. The fine hard members are further mixed with a predetermined rubber material to form a pin-like member before the adhesives are cured. The pin-like member is then embedded in a tread surface portion of the tire with a distal end of the pin-like member being exposed outside the surface of the tire.

According to the present invention, there is also provided a method for producing a slippage preventing tire. The method includes mixing hard fine members, including at least one member selected from the group consisting essentially of sand, ceramic particles and fiber reinforced resin particles, and adhesives. The fine hard members are further mixed with a predetermined rubber material before the adhesives are cured. A tread surface is formed, form which a pin-like; from which a pin-like member is projected by using the rubber material in accordance with a predetermined method.

It has been heretofore confirmed that sand has an excellent slippage preventing function. For example, when roads are covered with ice or snow if the road is sand is spread over the road.

The present inventor has noticed this fact and conducted various kinds of experiments on such an assumption that the mixture of sand in the tire member would exhibit an unexpected result of a slippage preventing effect.

However, the present inventor has found through repeated experiments that it would be impossible to obtain the unexpected result due to a dropping away of the sand from the tread surface during a travel test. Also, if the base material, that is, the rubber member of the tire, would be hardened at a low temperature below the freezing point, the slippage preventing function would be adversely affected. In this case, the sand might readily be away from the tread surface due to the hardening of the base member. Accordingly, it has been confirmed that the base material has to have a suitable elasticity even below the freezing point.

The present inventor has found that in order to firmly attach the sand to the rubber material, the sand and the adhesives are mixed with each other and the rubber material is mixed with the sand and the adhesives before the adhesives are cured. Also, he has found that if the silicone system resin having a suitable elasticity even at a temperature of about −20° C. is mixed thereinto, the sufficient elasticity of the rubber member may be maintained even at the low temperature.

Accordingly, a tire which is produced by mixing the sand and the adhesives, mixing the rubber material thereinto before the adhesives are cured, further mixing the silicone system resin or a tire having a plurality of pin-like members made such material on its tread surface may ensure the sufficient elasticity of the rubber member even at a low temperature and may prevent the sand from dropping away from the tread surface.

DESCRIPTION OF THE PREFERRED EMBODIMENTS

A first embodiment of the invention will now be described with reference to the accompanying drawings.

Figure 1:
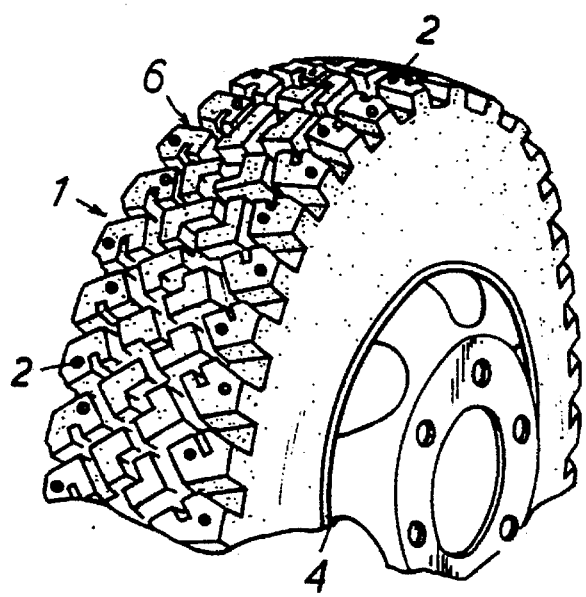
FIG. 1 is a partial perspective view showing, in use a tire according to a first embodiment of the invention.
Figure 2:
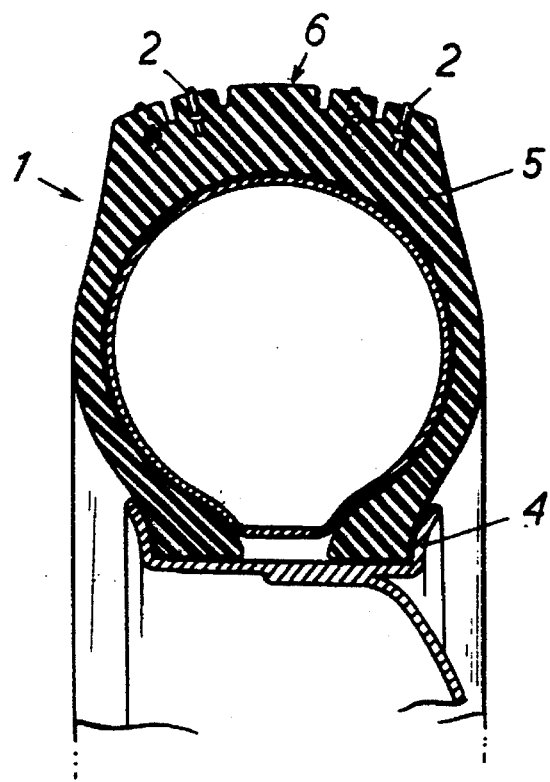
FIG. 2 is a partial cross-sectional view showing the condition shown in FIG. 1.
Figure 3:
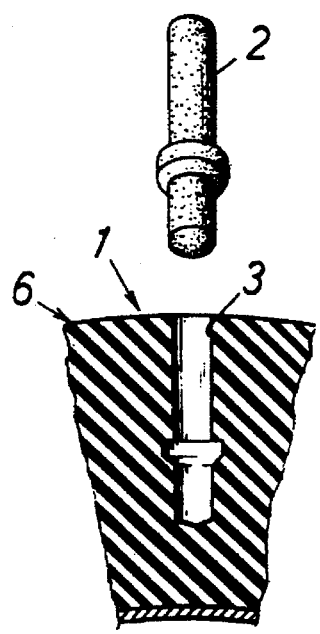
FIG. 3 is an illustration of a manufacturing method for the tire shown in FIG. 1.
Figure 4:
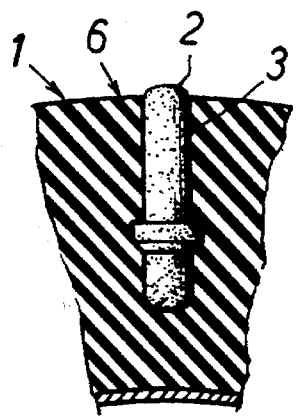
FIG. 4 is an illustration of the manufacturing method for the tire shown in FIG. 1.

Sand 7 or ceramic particles (alumina system) and adhesives 8, such as epoxy system adhesives, phenol system adhesives, rubber system adhesives and the like, are mixed and kneaded. When the adhesives 8 become semi-cured or non-cured, natural rubber or synthetic rubber, such as diene system synthetic rubber nitrile-butadiene rubber, neoprene system synthetic rubber, for example, chloroprene rubber or a mixture of both natural and synthetic rubbers is mixed with the adhesives. Furthermore, a silicone system resin, for example (silicone rubber) is mixed at a predetermined ratio to form a pin-like member 2 shown in FIG. 3. As shown in FIGS. 3 and the pin-like member 2 is embedded and secured in a hole 3 formed in a tread surface portion 6 of the tire 1. Any embedding and securing method may be applied to this case. For example, the embedding and securing may be carried out simultaneously with the molding of the tire. As a result of the above-described method, the tire FIGS. 1 and 2 may be produced.

Figure 5:
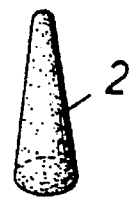
FIG. 5 is a perspective view showing a shape of a pin having a different shape from that of the first embodiment.

The mixture ratio among the sand 7, the adhesives 8, the synthetic rubber and the silicone rubber is preferably such that the sand is at about 20 to 30 g, the adhesives 8 are at about 10 g and the silicone rubber is at about 10 g with respect to the synthetic rubber of about 100 g. As a modification, the pin-like member 2 may be formed to have a tapered shape as shown in FIG. 5.

Figure 6:
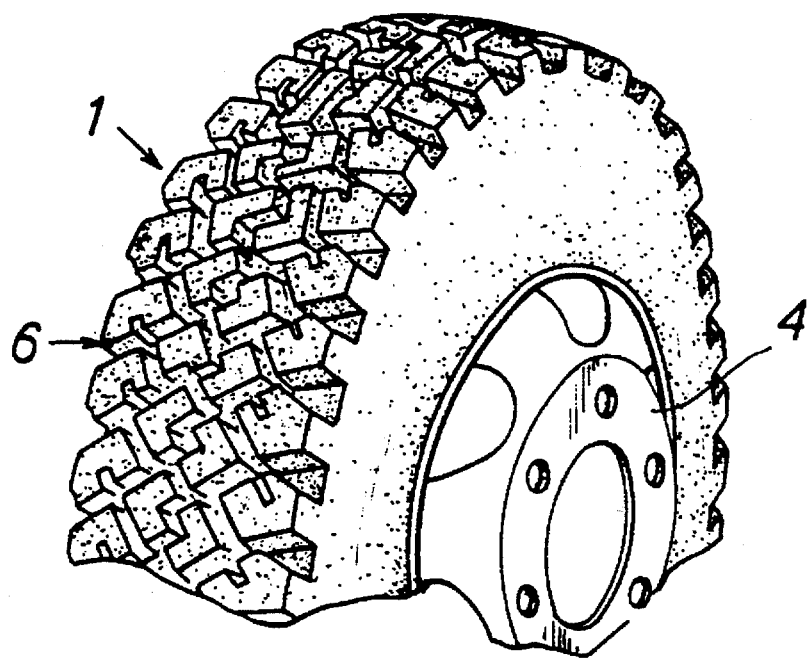
FIG. 6 is a partial perspective view showing, in use, a tire according to a second embodiment of the invention.
Figure 7:
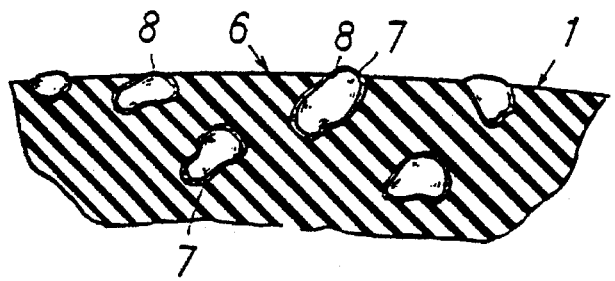
FIG. 7 is a partial enlarged cross-sectional view showing a portion of the embodiment shown in FIG. 6.

In a second embodiment of the invention, the mixture of the sand 7, the adhesives 8, the rubber material and the silicone rubber are used in the same way as in the first embodiment. A tread surface 6 is formed on a cushioning portion 5 of a tire in a suitable method (which includes steps of mixing a reinforcement member such as carbon, using a coloring material, vulcanization or the like), as shown in FIG. 6. As shown in FIG. 7, a part of the sand 7 is exposed on the tread surface 6 of the tire 1 as shown in FIG. 7.

In this case, the mixture ratio among the sand 7, the adhesives 8, the rubber material and the silicone rubber is almost the same as that of the first embodiment.

It is possible to control the hardness of the tire 1 to a hard level or a soft level by well selecting the mixture ratio of the sand 7 and the rubber material. The ratio may be suitably determined in view of the weather (i.e., frozen degree of the road) in an area where the tire 1 is to be used. Incidentally, if the content of the sand is increased, then the slippage preventing function will be enhanced but the durabilitiy of the tire will be degraded. Accordingly, in view of this point, the mixture ratio should be determined.

Any kind of sand 7 may be used. The granularity of the sand should be determined in view of the area where the tire 1 is to be used. It is preferable that the granularity be kept constant as much as possible.

It is possible to use, as the sand, ceramic particles (alumina system), fiber reinforced resin particles, small stones or the like. It is important that the sand should not cause any public pollution problem even if it flies in the air and the sand has a suitable hardness. The metallic sand is not suitable for the tire because the metallic particles would fly in the air to adversely affect human bodies. Incidentally, because the alumina particles are porous, the adhesives 8 are well, impregnated in the particles to enhance the adhesion with the rubber material. In addition, the aluminum particles have a function of absorbing moisture components on ice or snow by a capillary tube effect to thereby prevent the reduction of the grip effect of the sand on the road surface due to the presence of moisture components.

According to various experimental results made by the inventor, it has been found that, in a studded tire in which metal pins are embedded and a recently proposed tire where egg shell particles or walnut shell particles are embedded, a contact part between the tire and the frozen road surface is the distal ends of the pins or the egg shell or walnut shell pieces such contact parts have a small area and are embedded into the frozen road surface thereby damaging the road surface. However, according to the present invention, without relying upon such an embedding effect, the tire has a function to grip the frozen road surface by the surface where the fine particles are present. Accordingly, in the present invention, a very excellent slippage preventing effect is exhibited and at the same time, the problem of damaging the road surface may be solved. Figuratively, speaking, conventional tires are tires in which the metal nails are projected, whereas the tires 1 according to the invention are tires on which sand paper is attached.

As described above, in the tire 1 having the pin-like members 2 into which the sand is mixed in accordance with the first embodiment of the invention and in the tire 1 into which the sand is mixed in accordance with the second embodiment, the sand 7 is not dropped during the travel, the part of the sand is always exposed on the surface of the pin-like members 2 or on the tread surface 6 so that the frictional coeffecient is increased on the ice or snow by the sand 7 to exhibit a good slippage preventing effect without damaging the road surface. Additionally, the durability thereof is very much enhanced.

Even as the wear of the pin-like members 2 or the tread surface 6 develop wear, the above-described excellent advantages may be maintained. However, although the sand 7 is dropped in accordance with the wear of the pin-like members 2 and the tread surface 6, as described above, there is no fear that the sand 7 would be dropped apart from the tire without any wear of the pin-like members 2 and the tread surface portions 6. Even if the sand to be attached to the tire would be dropped off the pin-like members 2 or the tread surface 6, the tire will not be a tire which has no slippage preventing function.

Figure 8:
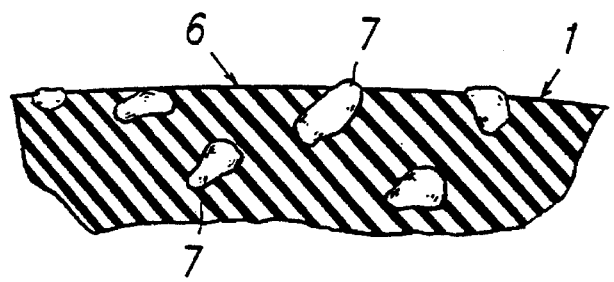
FIG. 8 is a partial enlarged cross-sectional view showing a part of a conventional tread portion.
Figure 9:
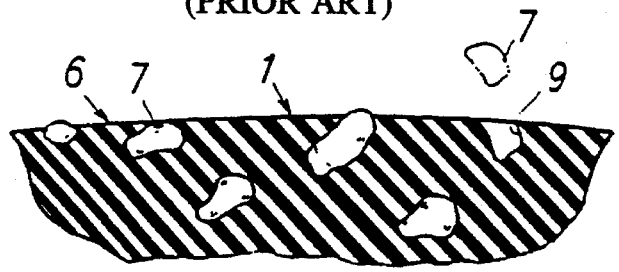
FIG. 9 is a partial enlarged cross-sectional view showing the part of the conventional tread portion shown in FIG. 8.

FIG. 8 shows a case where the sand 7, the rubber material and the silicone rubber are simply mixed without using the adhesives. According to an experiment using a sample, when the rubber material was drawn and the sand 7 was manually scraped out of the rubber material, the sand 7 embedded in the rubber material was readily dropped so that a hole 9 was formed at the position where the sand 7 had been embedded (see FIG. 9). In contrast, in accordance with the present embodiment, in the case where the adhesives 8 were used and mixed into the rubber material before the adhesives 8 have been cured, in an experimental sample, the adhesives 8 were interposed in the interface between the sand 7 and the rubber material, the sand 7 and the rubber material were firmly adhered to each other. In this latter case, the sand 7 was not dropped at all by the same manual scraping (see FIG. 7).

More specifically, in the former case, that is the conventional case, the sand 7 was just gripped in the rubber material, and although the sand 7 and the rubber material appeared as if the two components were adhered to each other before the cure of the rubber material, the two components were not effectively adhered to each other after the rubber material had been cured. The sand 7 was simply held by the rubber material and the sand 7 was readily dropped therefrom. In particular, if the rubber material was cured at a low temperature, the dropping phenomenon was remarkable. In the latter case, that is, the present invention, since the sand 7 and the rubber material were completely adhered to each other through the adhesives 8, such drop would not occur.

In the manufacturing step according to the present invention, when the adhesives 8 were mixed into the rubber material after the curing of the adhesives since the adhesives 8 were kept around the sand 7 under a condition where the sand 7 were coated with a cured hard layer of the adhesives 8, the sand 7 and the rubber material were not well adhered. This was the same condition as the case where the adhesives were not used. This result was experimentally confirmed.

As a matter of fact, a legal provision prohibits the use of studded tires. As a result they are wasted. If the stud pins of the studded tires were removed therefrom and the pin-like members 2 according to the first embodiment were embedded, it would be possible to manufacture tires having good slippage preventing function by utilizing the wasted articles. This is preferable from a point of view of reuse of the natural resources.

It is also possible to form the mixture of the sand 7, the adhesives 8, the rubber material and the silicone rubber in a strip shape and to attach the strip on the tread surface 6 of the tire.

Incidentally, for instance, if the above-described mixture of the sand 7, the adhesives 8, the rubber material and the silicone rubber were injected into a spray gun, it would be possible to repair the tire 1 and locally impart the slippage preventing function onto the tire 1 by spraying the mixture onto the tire when the tire 1 is worn.

Incidentally, reference numeral 4 denotes a wheel.

With the thus constructed structure, it is possible to provide a tire having an excellent slippage preventing function.

Various details of the invention may be changed without departing from its spirit or its scope. Furthermore, the foregoing description of the embodiments according to the present invention is provided for the purpose of illustration only, and not for the purpose of limiting the invention as defined by the appended claims or their equivalents.

What is claimed is:

1. A slippage preventing tire, comprising:

a plurality of hard fine members coated with adhesives, a silicone system resin, and a rubber material;

wherein said adhesive-coated hard fine members are distributed throughout said silicone system resin and said rubber material and include at least one member selected from the group consisting of sand, ceramic particles, and fiber reinforced resin particles; and wherein said hard fine members, adhesive, silicone systems resin, and rubber material comprise at least a tread portion of said slippage preventing tire.

2. A slippage preventing tire according to claim 1, wherein said tire is comprised of weight content ratio of about 20 to about 30 parts hard fine members, about 10 parts adhesives, and about 100 parts rubber material.

3. A slippage preventing tire according to claim 1, wherein said tire is comprised at a weight content ratio of about 20 to about 30 parts hard fine members, about 10 parts adhesives, about 10 parts silicone system resin and about 100 parts rubber material.

4. A slippage preventing tire according to claim 1, wherein an elasticity of said tire is maintained at temperatures below 0° C.

5. A method for producing a slippage preventing tire, comprising the steps of:

a) mixing hard fine members and adhesives, thereby attaching said adhesives to said hard fine members, said hard fine members include at least one member being selected from the group consisting of sand, ceramic particles and fiber reinforced resin particles;

b) mixing a silicone system resin with a rubber material;

c) mixing said hard fine members and said attached adhesives with said silicone system resin and said rubber material prior to curing said adhesives; and d) forming at least a tread surface of a tire from said mixed hard fine members, adhesives, silicone system resin, and rubber material, thereby providing said tire with excellent slippage preventing capacity.

6. A method for producing a slippage preventing tire according to claim 5, wherein hard fine members, said adhesives, and said rubber material are mixed at a weight content ratio of about 20 to about 30 parts hard fine members, about 10 parts adhesives, and about 100 parts rubber material.

7. A method for producing a slippage preventing tire according to claim 5, wherein hard fine members, said adhesives, said silicone system resin and said rubber material are mixed at a weight content ratio of about 20 to about 30 parts of said hard fine members, about 10 parts of said adhesives, about 10 parts of said silicone system resin and about 100 parts rubber material.

8. A method for producing a slippage preventing tire according to claim 5, wherein hard fine members are embedded in said rubber material by said mixing and fixed therein by said adhesives attached to said hard fine members. silicone resin, and a rubber material;

wherein said adhesive-coated hard fine members are distributed throughout said silicone resin and said rubber material and include at least one member selected from the group consisting of sand, ceramic particles, and fiber reinforced resin particles; and wherein said hard fine members, adhesive, silicone resin, and rubber material comprise at least a tread portion of said slippage preventing tire.

9. A slippage preventing tire produced according to the method of claim 5, wherein an elasticity of the tire may be maintained even below zero degrees centigrade.

10. A method for producing a slippage preventing tire, said method comprising the steps of:

a) mixing about 20 to about 30 parts by weight hard fine members and about 10 parts by weight adhesives, thereby attaching said adhesives to said hard fine members, said hard fine members include at least one member being selected from the group consisting of sand, ceramic particles and fiber reinforced resin particles;

b) mixing about 10 parts by weight of a silicone resin with about 100 parts by weight of a rubber material including at least one member selected from the group consisting of natural rubber, diene rubber, and neoprene rubber;

c) mixing said hard fine members and said attached adhesives with said silicone resin and said rubber material prior to curing said adhesives;

d) forming at least a tread surface of a tire from said mixed hard fine members, adhesives, silicone resin, and rubber material, thereby providing said tire with excellent slippage preventing capacity; and e) curing said adhesives, said silicone resin, and said rubber material.

11. A slippage preventing tire, comprising:

about 20 to about 30 parts by weight of a plurality of hard fine members including at least one member being selected from the group consisting of sand, ceramic particles and fiber reinforced resin particles;

about 10 parts by weight of adhesives coating said hard fine members;

about 10 parts by weight of a silicone resin; and about 100 parts by weight of a rubber material including at least one member selected from the group consisting of natural rubber, diene rubber, and neoprene rubber;

wherein said adhesive-coated hard fine members are distributed throughout said silicone resin and said rubber material; and wherein said hard fine members, said adhesive, said silicone resin, and said rubber material comprise at least a tread portion of said slippage preventing tire.

\* \* \* \* \*

UNITED STATES PATENT AND TRADEMARK OFFICE
CERTIFICATE OF CORRECTION

PATENT NO.   :   5,603,367
DATED        :   February 18, 1997
INVENTOR(S)  :   Seichi Watanabe It is certified that error appears in the above-identified patent and that said Letters Patent is hereby corrected as shown below:

Column 6, line 27, delete "system";

Column 6, line 29, delete "system";

Column 6, line 34, delete "system";

Column 6, line 55, delete "system";

Column 6, line 61, delete "system"; and

Column 7, lines 14 to 22, delete.

Signed and Sealed this

Twenty-first Day of October 1997

Attest:

BRUCE LEHMAN

Attesting Officer

Commissioner of Patents and Trademarks